UNITED STATES PATENT OFFICE.

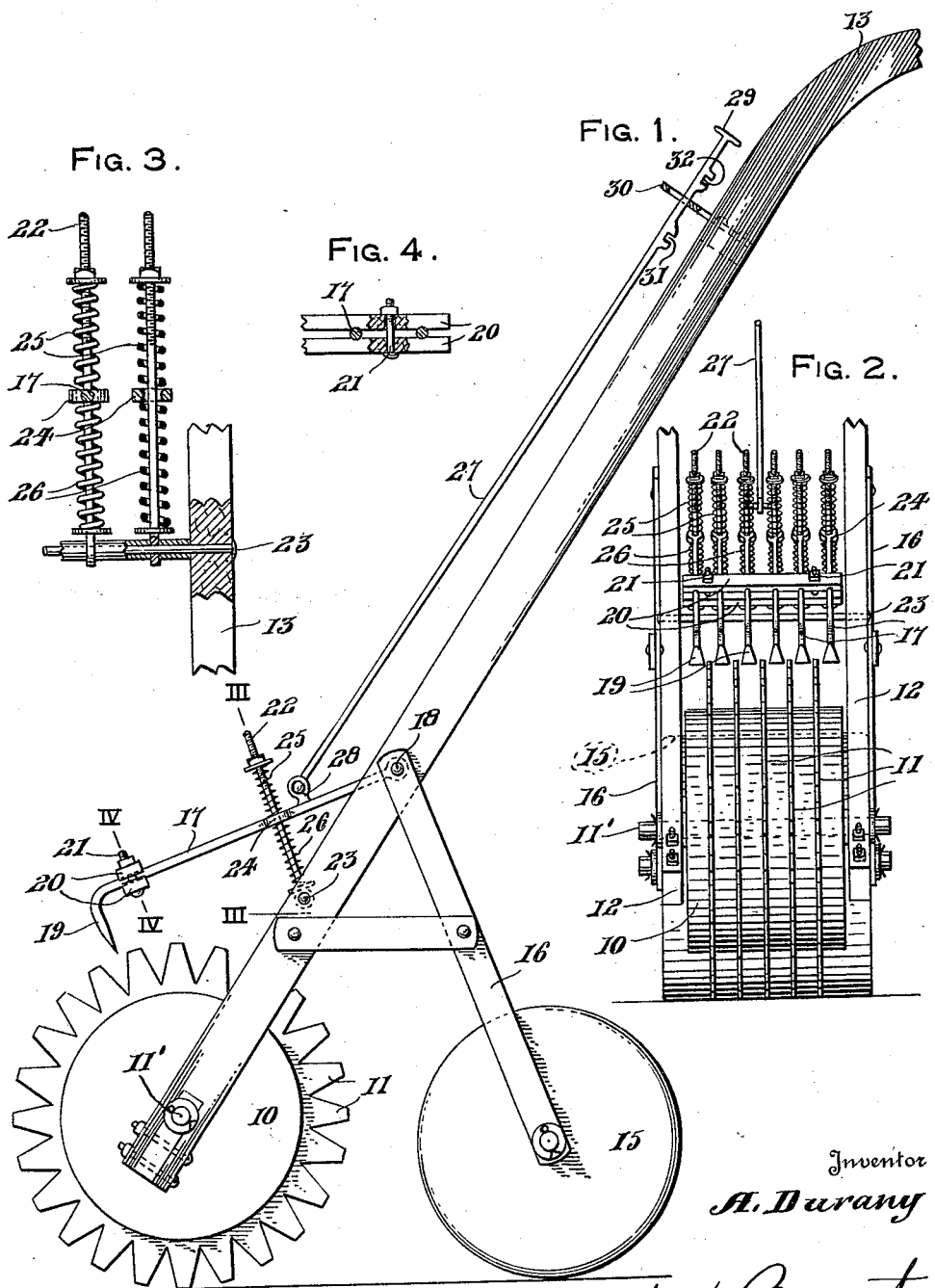

ANDREW DURANY, OF NEW BRITAIN, CONNECTICUT.

ONION-PLANT MACHINE.

1,407,133.　　　　　Specification of Letters Patent.　　Patented Feb. 21, 1922.

Application filed July 19, 1921. Serial No. 485,872.

*To all whom it may concern:*

Be it known that I, ANDREW DURANY, a citizen of Czecho-Slovakia, residing at New Britain, in the county of Hartford and State of Connecticut, have invented certain new and useful Improvements in Onion-Plant Machines, of which the following is a specification.

The primary object of the present invention is the provision of a machine that is readily pushed over the field for digging up the ground between the rows of vegetables, such as onion plants, the ground being rolled subsequently to the digging operation.

A further object of the invention is the provision of a cultivator for onion plants whereby the soil between the rows is easily and quickly mellowed and rolled leaving the same in a soft smooth condition.

A still further object of the device is to provide a combined cultivator and roller for planted fields having a self-cleaning means for the ground-digging members, the device being simple in construction, easy and inexpensive to manufacture.

With these general objects in view and others that will appear as the nature of the invention is better understood, the same consists in the novel construction, combination, and arrangement of parts hereinafter more fully described, illustrated in the accompanying drawings, and pointed out in the appended claims.

In the drawings forming a part of this application and in which like designating characters refer to corresponding parts throughout the several views, Figure 1 is a side elevation of the invention with a portion of the handles broken away, Figure 2 is a front elevation thereof, Figure 3 is an enlarged sectional detail view taken upon line III—III of Figure 1, and Figure 4 is an enlarged sectional view taken upon line IV—IV of Figure 1.

Referring more in detail to the drawing, the invention broadly consists of a roller 10 journaled by means of an axle 11 between two side rails 12 having handle portions 13 at their upper ends for pushing the device over the ground. The roller 10 is provided with a plurality of toothed disks 14 axially arranged thereon in equal spaced relations for digging into the ground during the travel of the device, a ground-engaging roller 15 being journaled in rearwardly projecting struts 16 for rolling down the ground after the toothed disks 14 have cut up and mellowed the surface thereof.

A plurality of hooks 17 are pivoted upon a transverse rod 18 between the side rails 12 at the point of connection between the said side rails 12 and the struts 16, the forward lower ends 19 of said hooks being broadened and in planes at opposite sides of the toothed disks 14. Bars 20 are secured to the opposite sides of the hooks 17 by bolts 21 for causing all of the hooks 17 to move simultaneously.

Upright bolts 22 are pivoted to a transverse rod 23 between the side rails 12 and passed through bosses 24 of the hooks 17. Each bolt 22 has an encircling spring 25 outwardly of its hook 17 and an encircling spring 26 inwardly thereof, whereby the said hooks are resiliently positioned intermediate the ends of the bolts 22. A pull rod 27 is pivoted at its lower end to eyes 28 carried by the two central hooks 17, the upper end of the rod 27 having a handle 29. The rod 27 freely extends through a bracket 30 and has spaced pairs of lugs forming grooves 31 and 32 adapted for adustably engaging the rack 30 when the rod 27 is adjusted in its raised or lowered position.

Pulling of the rod 27 to engage the groove 31 in the bracket 30 positions the hooks 17 uppermost above the level of the disk 14 while the release of the rod 27 causes the springs 25 to position the pointed ends 19 substantially on a plane with the periphery of the toothed disks 14. By lowering the rod 27 to engage the groove 32 with the bracket 30 the hook ends 19 are positioned inwardly toward the roller 10, between and outwardly of the toothed disk 14. The forward movement of the machine forces the teeth 14 into the soil by pressing upon the handles 13, the periphery of the roller 10 limiting the extent to which the teeth may enter the soil while the roller 15 follows over the ground and smooths the same. Any weeds that are taken up during the travel of the machine will be prevented from being carried along and deposited forwardly of the device by reason of the hooks 17 as the ends 19 thereof will engage the weeds and will act to clear the teeth 14 during operation. The action of the hooks 17 being resilient wherever the rod 27 may be adjusted because of the engaging springs 25 and 26.

The complete operation of the invention will be fully understood from this detailed description thereof, it being apparent that the ground will be readily removed between the rows of onion plants or any other vegetables while the soil will be left smooth and in good condition.

While the form of the invention herein shown and described is what is believed to be the preferred embodiment thereof, it is nevertheless to be understood that various forms, modifications and arrangements of the parts may be made without departing from the spirit and scope of the invention as claimed.

I claim:—

1. A device of the class described comprising side rails, a roller journaled between the lower ends thereof, a plurality of toothed disks carried by the roller adapted for engaging the ground outwardly of the roller during the travel of the device, a ground roller journaled upon said side rails at the rear of the machine and adjustable cleaning means for said toothed disk.

2. A device of the class described comprising side rails, a roller journaled between the lower ends thereof, toothed disks axially carried by the roller equally spaced apart and adapted for engaging in the surface of the ground, pivoted hooks carried by the side rails having relative movement in planes between said toothed disks, and a follow-up roller mounted beneath said side rails.

3. A device of the class described comprising side rails, toothed disks equally spaced apart journaled for simultaneous rotation between the lower ends of said rails, a follower roller beneath said side rails rearwardly of said disks, a plurality of hooks pivoted between the side rails adapted for movement in planes at different sides of said disks, connecting means between said hooks whereby the latter are adapted for simultaneous movement and resilient positioning means for the hooks, a plurality of bolts pivoted at their lower ends between said rails and freely projecting through said hooks, encircling springs around said bolts engaging the opposite sides of the hooks whereby the hooks are normally positioned with their lower free ends substantially in a plane with the outer periphery of the disks.

4. A device of the class described comprising side rails, toothed disks equally spaced apart journaled for simultaneous rotation between the lower ends of said rails, a follower roller beneath said side rails rearwardly of said disks, a plurality of hooks pivoted between the side rails adapted for movement in planes at different sides of said disks, connecting means between said hooks whereby the latter are adapted for simultaneous movement, resilient positioning means for the hooks, a plurality of bolts pivoted at their lower ends between said rails and freely projecting through said hooks, encircling springs around said bolts engaging the opposite sides of the hooks whereby the hooks are normally positioned with their lower free ends substantially in a plane with the outer periphery of the disks, a rod pivoted at its lower end to said hooks and extending upwardly between the said rails and provided with spaced grooves adjacent its upper end and a bracket carried by the rails through which said rod projects adapted for adjustable engagement therewith when the hooks are in their upper or lowered position.

In testimony whereof I affix my signature.

ANDREW DURANY.